United States Patent [19]

Nishino et al.

[11] 4,024,451
[45] May 17, 1977

[54] STABILIZED DC POWER SUPPLY DEVICE

[75] Inventors: Hisao Nishino; Kouichirou Ohta, both of Yokohama, Japan

[73] Assignee: Tohoku Metal Industries Limited, Japan

[22] Filed: Jan. 14, 1976

[21] Appl. No.: 648,908

[30] Foreign Application Priority Data

June 28, 1975 Japan .............................. 50-79733

[52] U.S. Cl. ..................................... 321/2; 321/14
[51] Int. Cl.² ......................................... H02H 7/12
[58] Field of Search ............ 321/2, 14, 25; 307/33, 307/34

[56] References Cited

UNITED STATES PATENTS

| | | |
|---|---|---|
| 3,199,015 | 8/1965 | Lackey et al. ........................ 321/25 |
| 3,337,787 | 8/1967 | Joseph .................................. 321/2 |
| 3,394,298 | 7/1968 | Logan .................................... 321/2 |
| 3,473,039 | 10/1969 | Fegley .................................. 321/2 |
| 3,818,308 | 6/1974 | Tamari .................................. 321/2 |

Primary Examiner—William H. Beha, Jr.

Attorney, Agent, or Firm—Flynn & Frishauf

[57] ABSTRACT

A stabilized DC power supply device providing a plurality of different stabilized DC powers with regulated voltage levels. Stabilized DC powers with rated currents of 2A. or less are taken out from transistor series regulator circuits, another stabilized power with rated current of 8–10A. or more is output from a magnetic amplifier regulator circuit and other powers with rated current of 8–10A. or less are obtained from transistor switching regulator circuits. The regulated voltage output from one of the switching regulator circuits is used as an input DC power for the series regulator circuits and is fed to them through an DC-AC inverter circuit and respective rectifier circuits. Input powers to both the switching regulator circuits and the magnetic amplifier regulator circuit are from a DC power source through a single DC-AC inverter circuit. The device is small in size and good in efficiency. Overvoltage and overcurrent prospective circuits are provided to stop the operation of the DC-AC inverter circuit when either overcurrent or overvoltage occurs.

12 Claims, 13 Drawing Figures

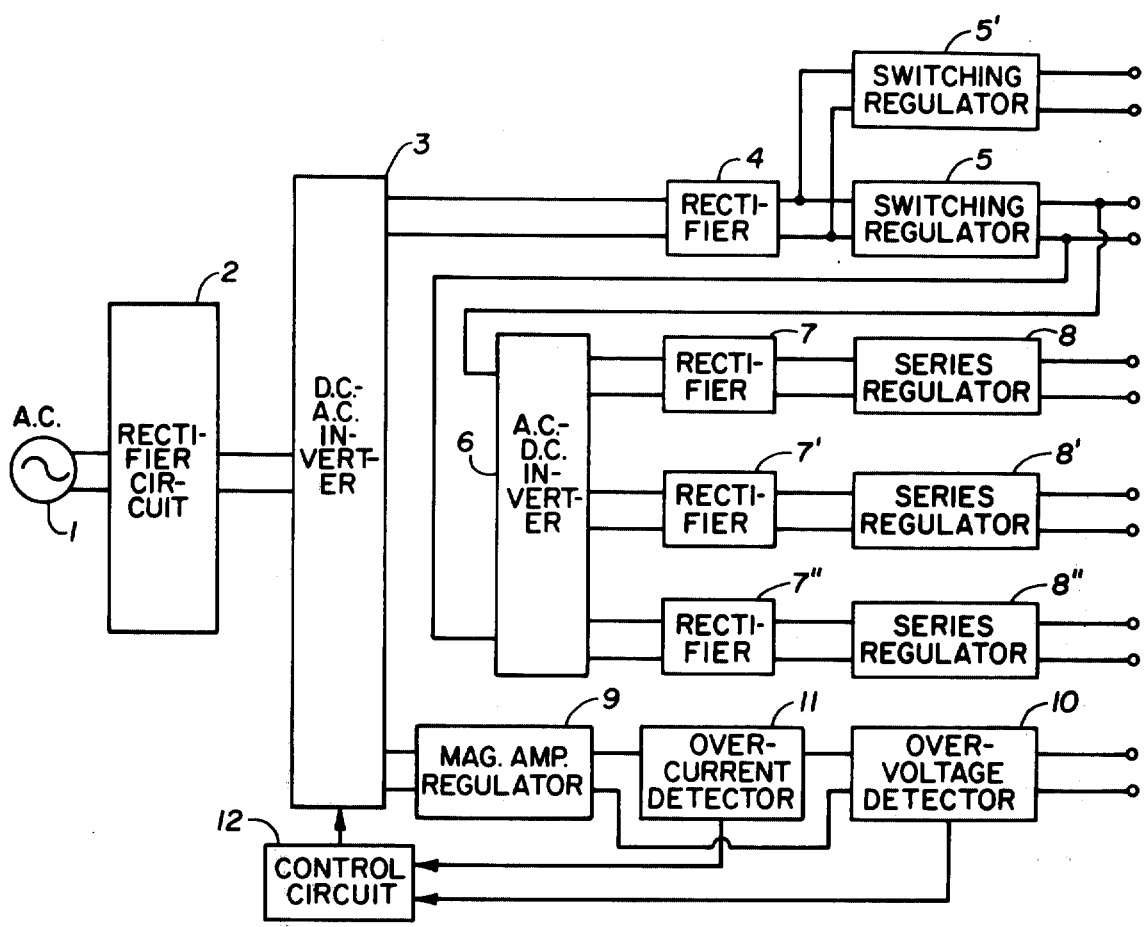
FIG.1
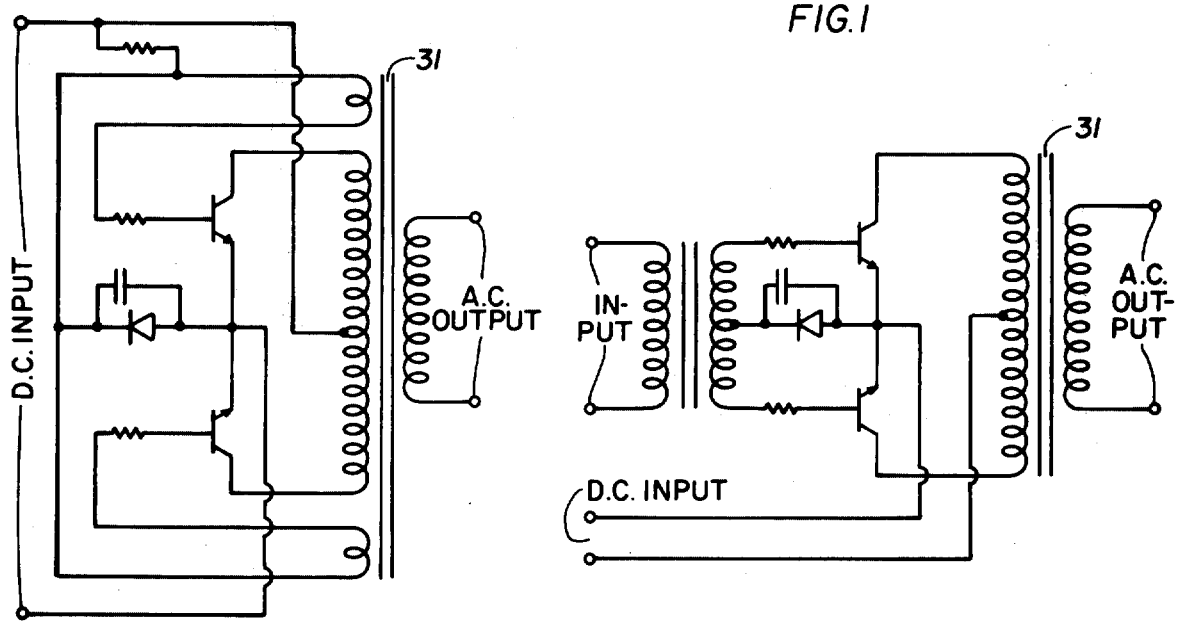
FIG.2
FIG.3

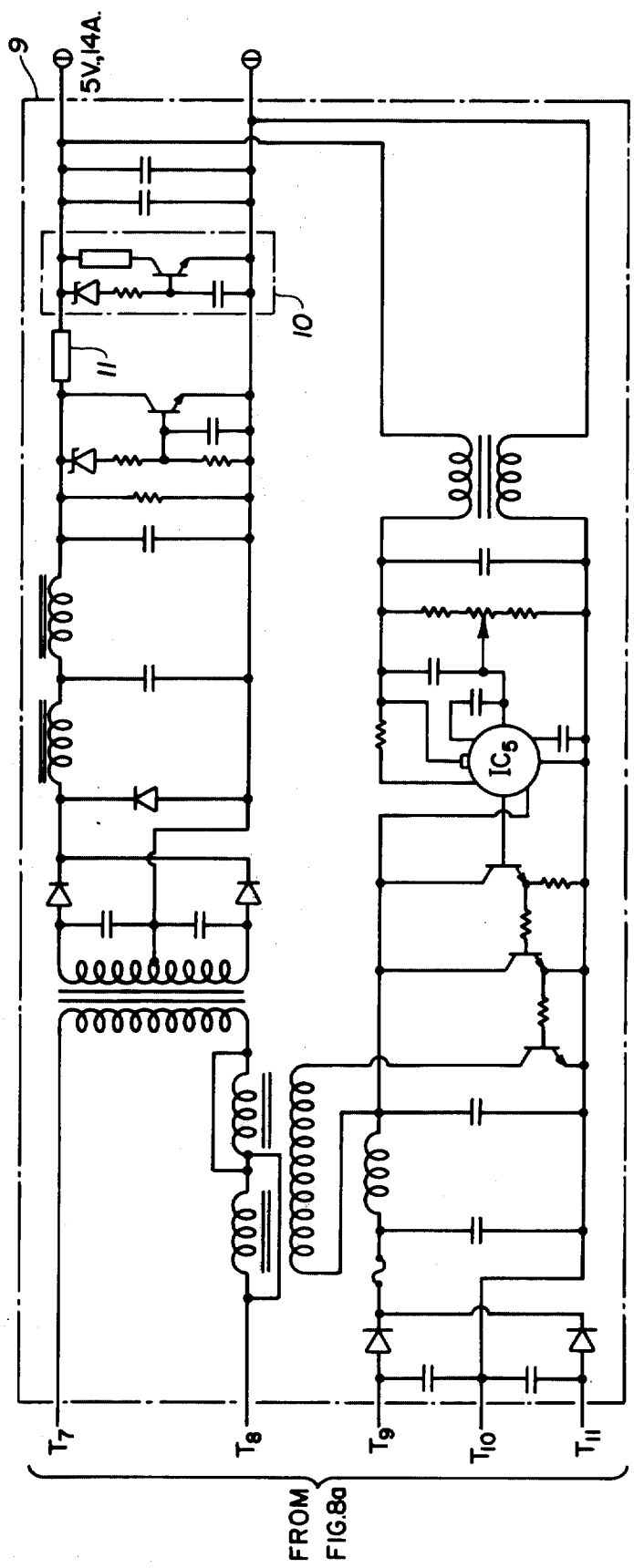
FIG.8d
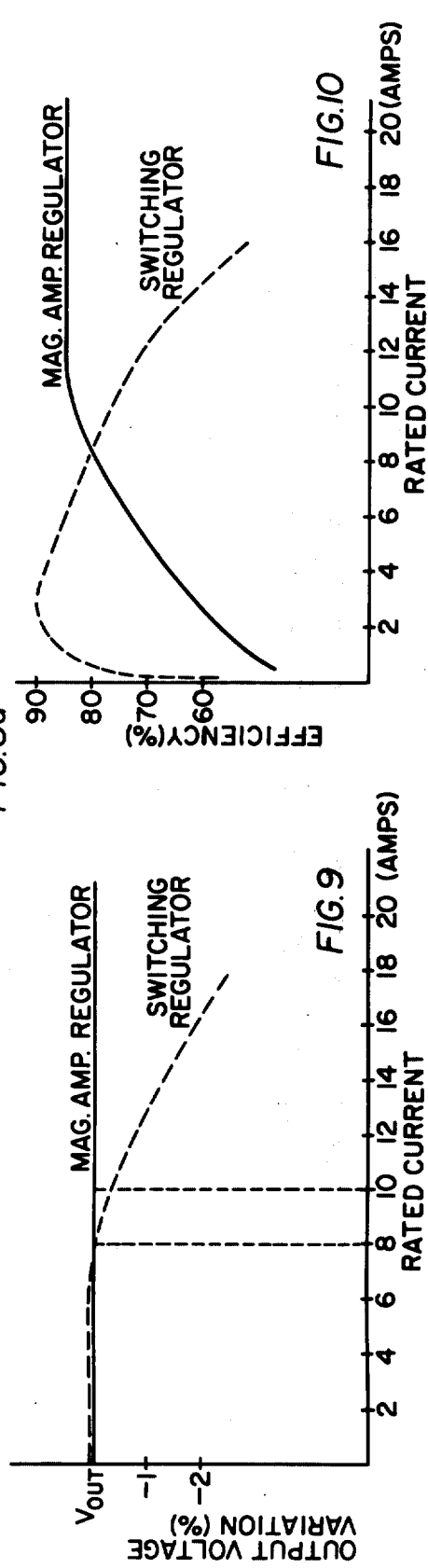
FIG.10
FIG.9

STABILIZED DC POWER SUPPLY DEVICE

BACKGROUND OF THE INVENTION

This invention relates to DC power supply devices, and, in particular, to devices which can supply a plurality of different DC powers with regulated voltages to operate a plurality of different loads.

Electronic parts and instruments are operated by DC powers and it is necessary to feed the DC power with a stable voltage level for the stable operation of such instruments and parts with high reliability.

Various DC regulator circuits such as, so called, series regulators, switching regulators, magnetic amplifier regulators and others have been known and used in the prior art to supply regulated DC voltage.

Furthermore, to develop a different voltage DC power from a given DC power, a DC-DC converter has been known and used in the prior art. The DC-DC converter usually comprises a DC-AC inverter circuit including an inverter transformer and a rectifier circuit. The DC-AC inverter circuit is classified into a self-exciting type and a separately-exciting type in the prior art.

To obtain a desired regulated voltage DC power from a DC power source, a DC-DC converter and a voltage regulator are used in combination.

Transistor circuits and/or integrated circuits are used in the DC-DC converter and the voltage regulator to make the regulated voltage DC power supply circuit small in size with a high efficiency and a low power loss.

On the other hand, a plurality of electronic instruments are often operated at one time. In such a case, DC-DC converters and voltage regulators are required correspondingly to respective instruments. But this results in increase of the volume of the entire system.

Therefore, in a certain case a single DC-AC inverter circuit is used which includes an inverter transformer having a plurality of secondary windings, to each of which windings a rectifier circuit and a regulator circuit are connected.

In this arrangement, if series regulator circuits are used, a greater heat radiation fin or a cooling device is required because voltage variation of a DC power source is applied to the regulator circuits to increase the heat developed at transistors in the circuits. Thus this arrangement fails in the reduction of the volume of the entire system.

If switching regulator circuits are used, series regulator circuits must be used in cascade, or a resistor must be used in series, to minimize the output ripple voltage at smaller loads. Therefore, in case regulated voltage DC powers are fed to smaller loads, this arrangement fails in the reduction of the volume.

SUMMARY OF THE INVENTION

A primary object of this invention is to provide a stabilized DC power supply device for feeding a plurality of DC powers with regulated voltage levels, which is simple in structure, small in volume, high in efficiency and low in cost.

Another object of this invention is to provide a stabilized DC power supply device with an overvoltage protective circuit and/or an overcurrent protective circuit.

Another object of this invention is to provide a stabilized DC power supply device wherein a single DC-AC inverter circuit is commonly used for a plurality of voltage regulator circuits of different types. Stabilized DC powers with regulated voltage levels are output from the voltage regulator circuits. One type of the voltage regulator circuits is a transistor switching regulator circuit. Another type is a transistor series regulator circuit, which is used for providing a lower DC power with a lower rated current than the switching regulator circuit. The other type is a magnetic amplifier regulator circuit, which is used for providing a DC power with a higher rated current than the switching regulator circuit.

The transistor series regulator circuit may be for a DC power with a regulated DC voltage level and a DC rated current of 2 amperes (A.) or less. The transistor switching regulator circuit may be for a DC power with a regulated DC voltage level and a DC rated current of 8–10 A. or less. The magnetic amplifier regulator circuit may be for a DC power with a regulated DC voltage level and a DC rated current above 8–10 A.

The series regulator circuit is coupled with the output of the switching regulator circuit through a transistor DC-DC converter circuit.

A further object of this invention is to provide the stabilized DC power supply device wherein a plurality of transistor switching regulator circuits are provided in parallel with one another.

A still further object of this invention is to provide a stabilized DC power supply device wherein a plurality of transistor series regulator circuits are provided in parallel with one another.

Further objects and features of this invention will be understood from following descriptions of embodiments of this invention referring to the annexed drawings.

BRIEF DESCRIPTION OF THE DRAWINGS

FIG. 1 illustrates a block diagram of an embodiment of this invention,

FIG. 2 illustrates an embodiment of a self-exciting DC-AC inverter circuit used in the device of this invention, FIG. 3 illustrates an embodiment of a separately-exciting DC-AC inverter circuit used in the device of this invention, FIGS. 8a–8d show a circuit diagram of a stabilized DC power supply device having five outputs according to this invention, FIG. 9 graphically shows an output voltage variation to various rated DC currents in each of transistor switching regulator circuit and magnetic amplifier regulator circuit, and FIG. 10 graphically shows efficiency variation to various DC rated current in the transistor switching regulator circuit and magnetic amplifier regulator circuit.

DETAILED DESCRIPTIONS OF PREFERRED EMBODIMENTS

Figure 4:
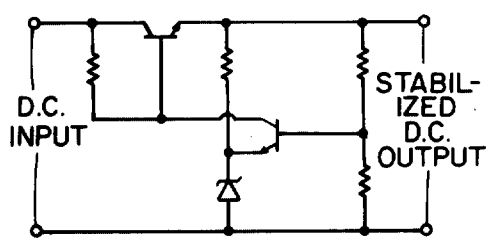
FIG. 4 illustrates an embodiment of a transistor series regulator circuit used in the device of this invention.

Generally speaking, a transistor series regulator circuit is not appropriate for the voltage regulation of a DC output with a rated current more than 2A., because when the output current exceeds 2A. Unreasonably large heat radiators are required to be used for cooling transistors used in the circuit.

A transistor switching regulator circuit is not proper for the voltage regulation of a DC output with a rated current more than 8–10 A. In such a high current level, the transistor switching regulator circuit is degraded in its voltage regulating function and in the efficiency $\eta$, as shown in FIG. 9 and 10.

Moreover, a magnetic amplifier regulator circuit is degraded in the efficiency $\eta$ when it is used for the voltage regulation of a DC output with a current lower than 8–10 A., as shown in FIG. 10.

This invention contemplates to provide a novel combination of a transistor series regulator circuit, a transistor switching regulator circuit and a magnetic amplifier regulator circuit so that a small, economical and efficient DC power supply device is provided which supplies a plurality of different DC powers with regulated voltage levels.

Referring to FIG. 1, a stabilized DC power supply device according to this invention is shown, which provides a plurality of different DC powers with regulated voltage levels.

The device comprises a DC power source which comprises a commercial AC power source 1 and a rectifier circuit 2 comprising diodes. Various known rectifier circuits are employed.

The DC power source may be an electric cell or a battery.

The DC output from the DC power source is converted to AC power with a high frequency such as 20 KHz at a DC-AC inverter circuit 3. For the DC-AC inverter circuit, a self-exciting transistor inverter circuit as shown in FIG. 2 or a separately-exciting transistor inverter circuit as shown in FIG. 3 is used. Various known DC-AC inverter circuits may be also employed.

The DC-AC inverter circuit 3 provides three AC outputs. Therefore an inverter transformer 31 (FIG. 2 and FIG. 3) of the inverter circuit 3 has three secondary windings.

One of the two AC outputs of the inverter circuit 3 is rectified at a diode rectifier circuit 4 and the resultant rectified DC output is fed to a transistor switching regulator circuit 5, from which a DC power is obtained with a regulated voltage level.

The transistor switching regulator circuit is predetermined to be 8–10 A. or less in its rated current.

Figure 5:
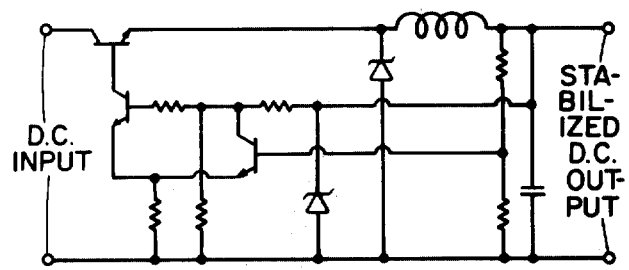
FIG. 5 illustrates an embodiment of a transistor switching regulator used in the device of this invention.

As the transistor switching regulator circuit, a circuit shown in FIG. 5 or other known transistor regulator circuits are used.

In order to obtain different DC powers with DC rated currents less than 8–10 A., one or more similar transistor switching regulator circuits may be coupled with the output of the rectifier circuit 4 in parallel with the transistor switching regulator 5. In the drawing, one transistor switching regulator circuit 5' is shown besides the transistor switching regulator circuit 5.

A DC-AC inverter circuit 6, for which a known DC-AC inverter circuit such as shown in FIGS. 2 and 3 is used, is coupled with the output of the transistor switching regulator circuit 5 to provide AC power having a high frequency such as 20 KHz.

The output of the inverter circuit 6 is rectified at a diode rectifier circuit 7 and, thereafter, is fed to a transistor series regulator circuit 8, from which a DC power with a regulated voltage level is obtained. A transistor series regulator circuit shown in FIG. 4 or other known transistor series regulator circuits may be used for the series regulator circuit 8. The DC rated current of the series regulator circuit 8 is predetermined lower than that from each of the switching regulator circuits 5 and 5' and to be less than 2A.

If different DC powers are desired, which are 2A. or less in rated current, a plurality of additional rectifier circuits are provided with on the output side of the inverter circuit 6 and similar series regulator circuits are additionally connected to the rectifier circuits, respectively. In the drawing, two additional rectifier circuits 7' and 7" and two additional series regulator circuits 8' and 8" are shown. In this case, an inverter transformer of the inverter circuit (FIG. 2 or FIG. 3) has three secondary windings which are connected to rectifier circuits 8, 8' and 8", respectively.

If, for the DC-AC inverter circuit 6, a separately-exciting inverter circuit such as the one in FIG. 3 is used, one of outputs of the DC-AC inverter circuit 3 may be used for the exciting power. Therefore the inverter transformer of the inverter circuit 3 has another secondary windings for obtaining the exciting power.

Figure 6:
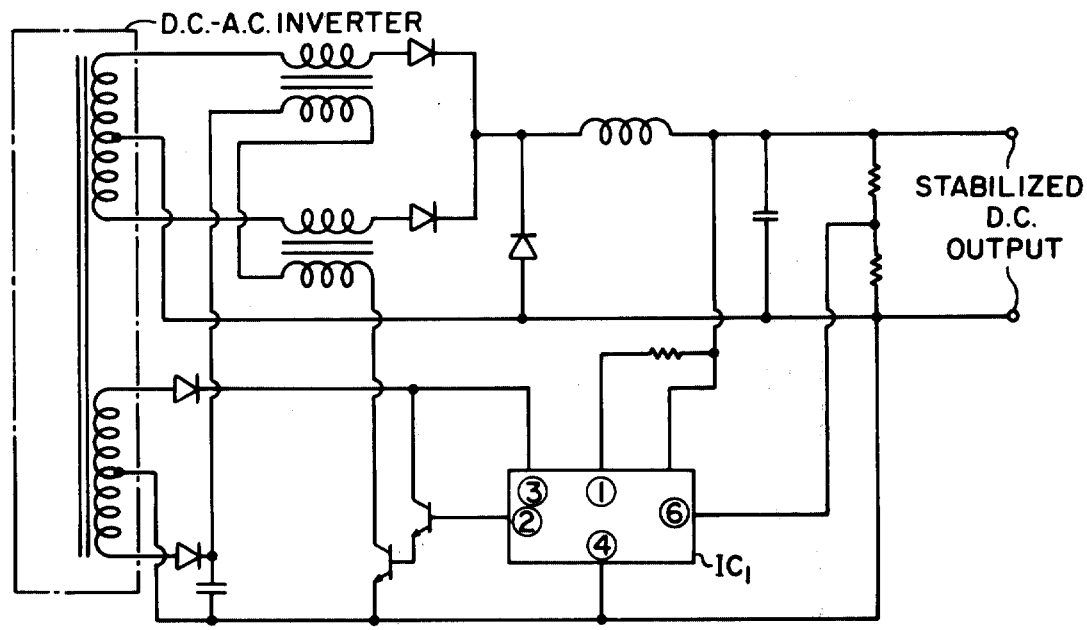
FIG. 6 illustrates an embodiment of a magnetic amplifier regulator circuit used in the device of this invention.

The other outputs of the inverter circuit 3 are coupled with a magnetic amplifier regulator circuit 9 to provide a DC power with a regulated voltage level. For the magnetic amplifier regulator circuit 9, various known circuits may be used. An example is shown in FIG. 6. $IC_1$ in FIG. 6 represents a voltage regulator linear integrated circuit (IC), for example, $\mu PC$ 141A. which is produced by Nippon Electric Company Ltd. in Japan and is commercially available.

The rated current of the magnetic amplifier regulator circuit 9 is predetermined higher than the rated current of each of switching regulator circuits 5 and 5'.

In the DC supply device, a simple DC-AC inverter circuit is commonly used to obtain a plurality of high frequency AC powers from which DC powers are obtained. Series regulator circuits are used for lower stabilized DC powers, to which a regulated DC voltage output from a switching regulator circuit is applied through a DC-DC converter including a DC-AC inverter circuit and a rectifier circuit so that a reduced heat develops in the transistors of the series regulator circuits. Moreover, for obtaining a stabilized higher DC power, a magnetic amplifier regulator circuit is used, so that the heat is developed less than in the other transistor regulator circuits.

As a result, the device is small in volume and good in efficient because large and many heat radiating means are not necessary.

Moreover, the switching regulator circuit 5 has at least one series regulator circuit 8 through the DC-AC inverter circuit 6 and the rectifier circuit 7 in parallel with a load to be connected to the output thereof. Thus the output ripple voltage of the switching regulator circuit 5 is reduced.

The device in FIG. 1 is provided with an overvoltage protective circuit which comprises an overvoltage detecting circuit 10.

The overvoltage detecting circuit 10 is provided on the output side of the magnetic amplifier regulator circuit 9 to detect the overvoltage of the output thereof. When the detecting circuit 10 detects the overvoltage, a control circuit 12 serves to prevent the inverter circuit 3 from the operating.

Figure 7:
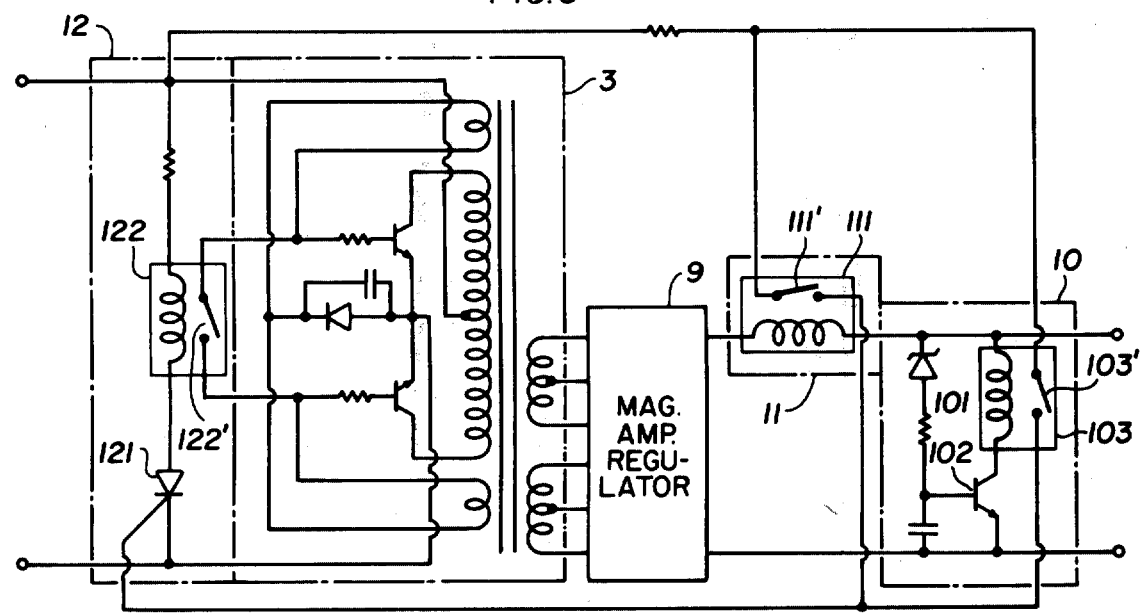
FIG. 7 illustrates an embodiment of an overvoltage and overcurrent protective circuit in this invention.
Figure 8A:
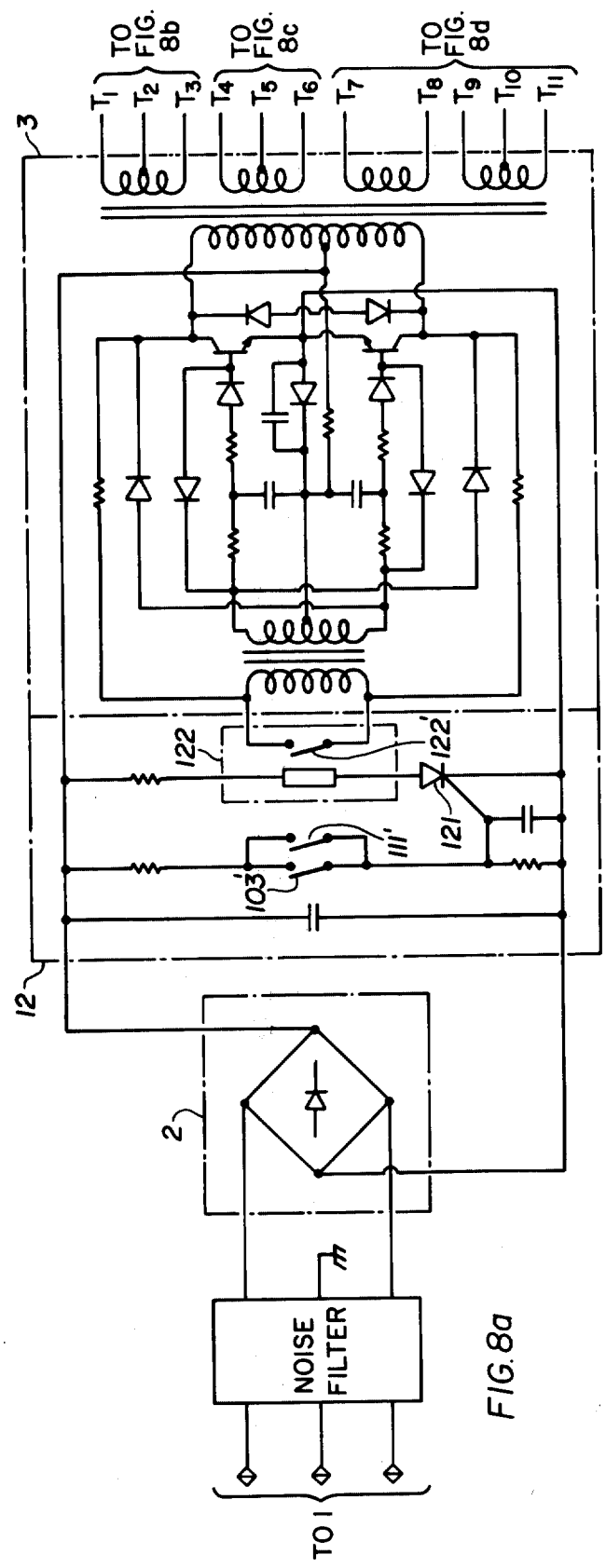
Figure 8B:
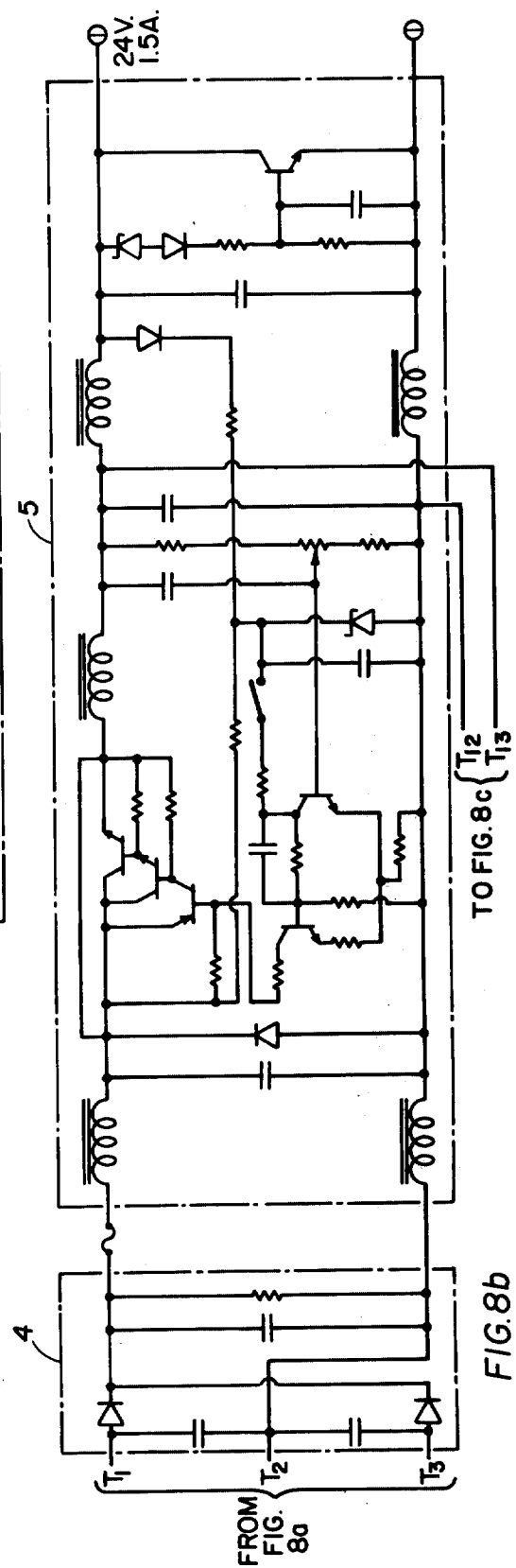
Figure 8C:
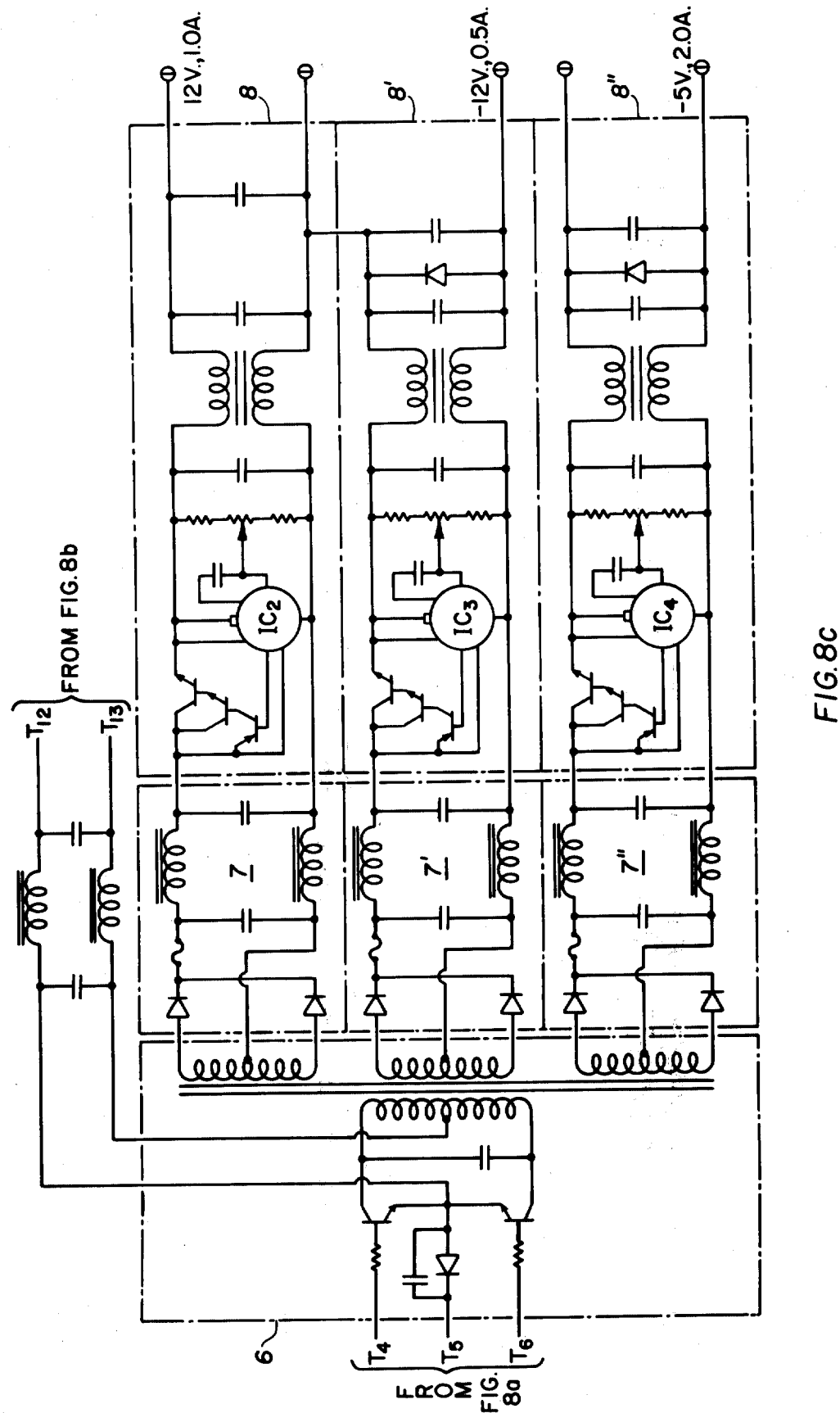

Referring to FIG. 7, when the output of the magnetic amplifier regulator circuit exceeds a predetermined DC voltage level, a zener diode 101 is conducted. Therefore a transistor 102 is switched on so that a relay 103, or a reed relay, is switched on. Thus, the overvoltage is detected.

When the reed relay 103 is switched on, a thyristor 121 is actuated and a relay or a reed relay 122 is switched on. If the operating contacts of the relay 122 are connected in the inverter circuit 3 to short-circuit a partial circuit thereof, the operation of the inverter circuit 3 stops when the reed relay 122 is switched on. In the drawing, the operating contacts 122' of the relay 122 are connected between bases of two transistors of the inverter circuit 3.

Thus, the inverter circuit 3 is controlled to stop operating when the overvoltage is detected.

Moreover, the device in FIG. 1 has an overcurrent protective circuit. The overcurrent prospective circuit comprises an overcurrent detecting means 11, such as an overcurrent relay 111 as shown in FIG. 7, the detecting output of which is fed to the control circuit 12 to stop the operation of the inverter circuit 3.

Referring to FIG. 7, overcurrent relay 111 is provided on the output side of the magnetic amplifier regulator circuit 9 to detect overcurrent. The operating contacts 111' of the relay 111 are connected in parallel with the operating contacts 103' of the relay 103. Therefore, when the overcurrent is detected at the relay 111, the thyristor 121 is actuated so that the operation of the inverter circuit 3 stops as above described.

As will be easily understood, once the thyristor 121 is actuated, it is maintained conductive until it is turned off, for example, by stopping the supply of the AC power source 1.

FIGS. 8a–8d show a concrete circuit diagram of an embodiment of this invention, which provides five different DC powers with regulated voltage levels. In the drawing, similar parts or circuit blocks are indicated by same reference numerals as in FIG. 1 and FIG. 7. Circuit elements indicated by $IC_1$–$IC_5$ are integrated circuits μPC 141A. by Nippon Electric Company Ltd. is used for each of these integrated circuits $IC_1$–$IC_5$. LM 100, LM 200 or LM 300 may be also used or each integrated circuit, which are produced by National Semiconductor Corporation and are commercially available.

The device in FIGS. 8a–8d has been designed to obtain from outputs A-D four stabilized DC powers of 24V–1.5 A., 12V–1.0A., -12V–0.5A., -5V–2.0A. and 5V–14A., respectively.

This invention has been described in conjunction with preferred embodiments. However it is easily understood to those skilled in the art that various modifications and other alterations can be made within the scope of this invention.

What is claimed is:

1. A stabilized DC power supply device for providing a plurality of different DC powers with regulated voltage levels and with different rated currents, comprising:
    a DC power source,
    a main DC-AC inverter circuit coupled to said DC power source and providing high frequency AC outputs from said DC power source, said main inverter circuit comprising transistor circuit means an inverter transformer coupled to said transistor circuit means, said transformer having first, second and third secondary windings, from each of which a high frequency AC output is taken out,
    a rectifier circuit coupled to said first secondary windings of said inverter transformer for rectifying the AC output presented on said first secondary windings of said inverter transformer to provide a DC output,
    a transistor switching regulator circuit coupled to the DC output from said rectifier circuit and providing a predetermined first DC power with a regulated voltage level at a DC output thereof,
    a DC-DC converter circuit coupled with said DC output of said transistor switching regulator circuit,
    a transistor series regulator circuit coupled to an output of said DC-DC converter and having an output providing a predetermined second DC power with a regulated voltage level and with a lower rated current than said first DC power,
    a magnetic amplifier regulator circuit coupled to said second and third secondary windings of said inverter in said main DC-AC inverter circuit, said magnetic amplifier regulator circuit having an output providing a predetermined third DC power with a regulated voltage level and with a higher rated current than said first DC power,
    means coupled to said magnetic amplifier regulator circuit for detecting overvoltage of the output from said magnetic amplifier regulator circuit and having an output indicating an overvoltage condition, said overvoltage detecting means including a zener diode coupled to said magnetic amplifier regulator circuit and which conducts when the output voltage of said magnetic amplifier regulator circuit exceeds a predetermined voltage level, a transistor coupled to said zener diode so as to conduct when said zener diode is conducting, and a relay coupled to said transistor and which is switched on when said transistor is conducting.
    means coupled to said magnetic amplifier regulator circuit for detecting overcurrent of the output from said magnetic amplifier regulator circuit and having an output indicating an overcurrent condition, said overcurrent detecting means including an overcurrent relay coupled to said magnetic amplifier regulator circuit and which is switched on when the output current of said magnetic amplifier regulator circuit exceeds a predetermined current level, and
    control means including a thyristor coupled to said main DC-AC inverter circuit and to said relays of both said overvoltage detecting means and said overcurrent detecting means, said thyristor being actuated responsive to at least one of said relays being switched on, and a further relay coupled to said thyristor and to said main DC-AC inverter circuit, said further relay being switched on when said thyristor is actuated to short-circuit a partial circuit path of said main DC-AC inverter circuit to stop the operation of said main DC-AC inverter circuit.

2. The stabilized DC power supply device as claimed in claim 1, wherein said DC power source comprises a commercial AC power source and a further rectifier circuit coupled to said AC power source for rectifying the commercial AC power.

3. The stabilized DC power supply device as claimed in claim 1, comprising at least one additional transistor switching regulator circuit connected to said rectifier circuit which is coupled to said AC output from said main DC-AC inverter circuit, each of said additional transistor switching regulator circuits being in parallel with one another and providing different DC powers with regulated voltage levels.

4. The stabilized DC power supply device as claimed in claim 3, wherein said DC power source comprises a commercial AC power source and a further rectifier circuit coupled to said AC power source for rectifying the commercial AC power.

5. The stabilized DC power supply device as claimed in claim 1, wherein said DC-DC converter circuit comprises a second DC-AC inverter circuit which includes transistor circuits coupled to a second inverter transformer having a plurality of secondary windings and a plurality of second rectifier circuits which are connected to respective ones of said plurality of secondary windings of said second inverter transformer, a plurality of second transistor series regulator circuits connected to respective ones of said plurality of second rectifier circuits to respectively provide a plurality of different stabilized DC powers with lower rated currents than the first DC power from said first mentioned transistor switching regulator circuit.

6. The stabilized DC power supply device as claimed in claim 5, wherein said second DC-AC inverter circuit is of a separately-exciting type.

7. The stabilized DC power supply device as claimed in claim 6, wherein said inverter transformer of said main DC-AC inverter circuit is provided with a fourth secondary winding, said fourth secondary winding being connected with said second separately-exciting DC-AC inverter circuit, said fourth secondary winding providing an output which is coupled to said second separately-exciting DC-AC inverter circuit to serve as an exciting power for said second separately-exciting DC-AC inverter circuit.

8. The stabilized DC power supply device as claimed in claim 5, wherein said DC power source comprises a commercial AC power source and a further rectifier circuit coupled to said AC power source for rectifying the commercial AC power.

9. The stabilized DC power supply device as claimed in claim 1, comprising at least one additional transistor switching regulator circuit connected to said rectifier circuit which is coupled to said AC output from said main DC-AC inverter circuit, each of said additional transistor switching regulator circuits being in parallel with one another and providing different DC powers with regulated voltage levels, and wherein said DC-DC converter circuit comprises a second DC-AC inverter circuit which includes transistor circuits coupled to a second inverter transformer having a plurality of secondary windings and a plurality of second rectifier circuits which are connected to respective ones of said plurality of secondary windings of said second inverter transformer, a plurality of second transistor series regulator circuits connected to respective ones of said plurality of second rectifier circuits to respectively provide a plurality of different stabilized DC powers with lower rated currents than the DC powers from said transistor switching regulator circuits.

10. The stabilized DC power supply device as claimed in claim 9, wherein said second DC-AC inverter circuit is of a separately-exciting type.

11. The stabilized DC power supply device as claimed in claim 10, wherein said inverter transformer of said main DC-AC inverter circuit is provided with a fourth secondary winding, said fourth secondary winding being connected with said second separately-exciting DC-AC inverter circuit, said fourth secondary winding providing an output which is coupled to said second separately-exciting DC-AC inverter circuit to serve as an exciting power for said second separately-exciting DC-AC inverter circuit.

12. The stabilized DC power supply device as claimed in claim 9, wherein said DC power source comprises a commercial AC power source and a further rectifier circuit coupled to said AC power source for rectifying the commercial AC power.

* * * * *